Feb. 14, 1933.  N. T. McCANN  1,897,206

CASING CUTTER

Filed Dec. 1, 1931

INVENTOR.
NEAL THOMAS McCANN.
BY
H. A. Duckman
ATTORNEY.

Patented Feb. 14, 1933

1,897,206

UNITED STATES PATENT OFFICE

NEAL THOMAS McCANN, OF HUNTINGTON BEACH, CALIFORNIA, ASSIGNOR OF ONE-FOURTH TO GROVER C. DODSON, OF LONG BEACH, CALIFORNIA

CASING CUTTER

Application filed December 1, 1931. Serial No. 578,331.

This invention relates to a casing cutter whereby the casing or pipe in a well may be severed and removed if necessary.

An object of my invention is to provide a novel means of expanding or contracting the cutter when the tool is in the hole.

Another object is to provide a casing cutter in which no springs are required to actuate any of the parts therefor, a cutter is provided which is simple in construction, which will not easily get out of order, and which is simple and easy to operate.

Other objects, advantages and features of invention may appear from the accompanying drawing, the subjoined detailed description and the appended claims.

Figure 1:
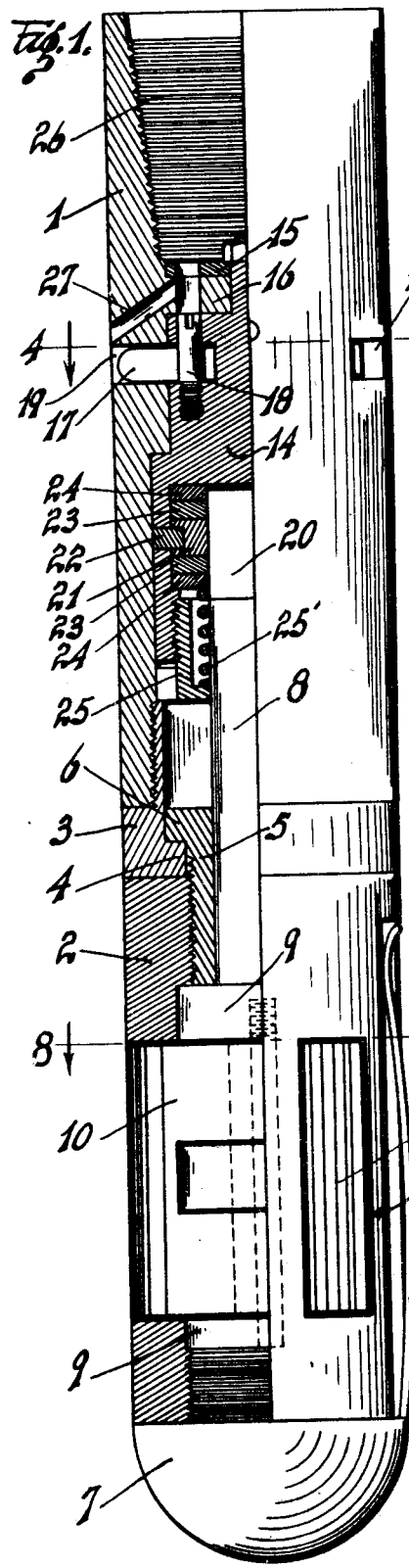
Figure 1 is a half, longitudinal, sectional view of my casing cutter.
Figure 2:
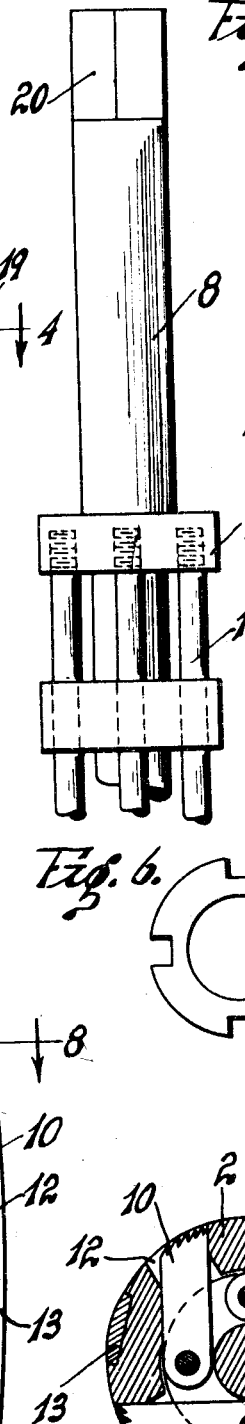
Figure 2 is a fragmentary side elevation of the driving shank.
Figure 3:
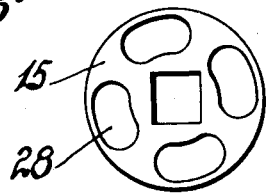
Figure 3 is a top plan view of the disc valve.
Figure 4:
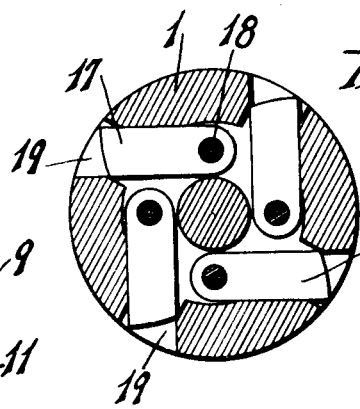
Figure 4 is a sectional view taken on line 4, 4 of Figure 1.
Figure 6:
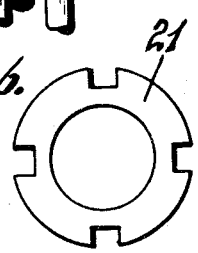
Figure 6 is a plan view of one of the driving rings.
Figure 5:
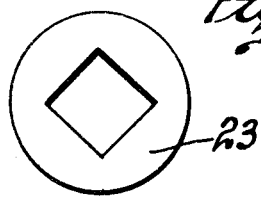
Figure 5 is a plan view of one of the friction discs.
Figure 7:
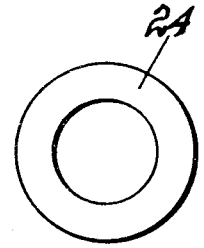
Figure 7 is a plan view of another friction disc.
Figure 8:
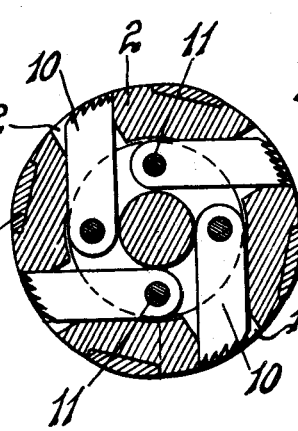
Figure 8 is a sectional view taken on line 8, 8 of Figure 1.

Referring more particularly to the drawing, my casing cutter comprises an upper or cutter body 1 and a lower or dog body 2. The bodies 1, 2 are attached together so that they can rotate relative to each other by means of a coupling nut 3, which screws into the bottom of the body 1 and which is provided with an annular inwardly extending shoulder 4.

A nut 5 screws into the top of the body 2 and is provided with an outwardly extending shoulder 6. The shoulders 4, 6 bear against each other and thus the body sections 1, 2 are rotatably connected together. A plug 7 screws into the bottom of the body section 2 to close the same.

A driving shank 8 is centrally mounted in the tool and is provided with three spaced annular flanges 9. A plurality of dogs 10 are pivotally mounted between the flanges 9 on pins 11. Each of the dogs project through an opening 12, which is formed in the body section 2. A plurality of wall engaging springs 13 are provided on the body section 2 to hold the section against rotation while the dogs are being expanded, as will be further described.

A core 14 is suspended in the body 1 adjacent the upper end thereof by means of a valve plate 15 which is attached to the upper end of the core by suitable means, and the valve plate rests upon a transverse wall 16. A plurality of blade cutters 17 are hingedly mounted on the core 14 by means of pins 18. The cutters are adapted to project horizontally out of the openings 19 which are formed in the body 1. The cutters will project and contract, and are also pressed against the casing by frictional means as follows: The top of the shank 8 is squared as shown at 20. A drive ring 21 has a circular opening in the center thereof. A plurality of keys 22 project from the core 14 into the ring, thus it will be evident as the ring is rotated the core will also be rotated.

Above and below the ring 21, I provide a pair of superimposed friction rings 23 and 24. The rings 23 have a square central opening so as to fit over the square end 20, and consequently these rings will rotate with the shank 8. The rings 24 have a circular opening in the center, and consequently are only driven by the frictional engagement with the rings 23. The rings 23 also contact the drive ring 21 and the frictional engagement of these rings will press the cutters outwardly, as will be further described. The rings 21, 23 and 24 are pressed together by a nut 25 which screws into the bottom of the core 14 and against a spring 25' which presses against the lower ring.

The drill pipe screws into the top of the body 1 by the usual threaded connection 26, and circulating fluid passes down through the pipe and out of ports 27 formed in the body 1. The valve ring 15 is provided with slotted openings 28 and when the ring has been rotated so that the openings 28 and ports 27 do not coincide, the fluid will be stopped indicating that the maximum expansion of the cutters has been reached.

The operation of my invention is as follows:

In going into the casing in order to cut the same at any desired point, the tool is attached to the drill pipe and lowered to the desired point. The spring arms 13 engage the casing and hold the body section 2 against rotation. Continued rotation of the drill pipe and the body section 1 will cause shank 8 to rotate through the medium of the friction rings 23, 24, and the driving ring 21. This rotation will cause the dogs 10 to move outwardly and engage the wall of the casing. The engagement of the dogs with the casing stops the rotation of the shank 8, and the friction drive is then imparted from the shank through the friction rings to the core 14. The horizontally positioned cutters 17 are thus caused to move outwardly and engage the casing. The body section 1 continues to rotate and the friction rings 23, 24 slip past each other, but there is sufficient engagement between these rings so that the cutters are forced into the casing and continue to feed at the pre-determined pressure as set by the nut 25 on the spring 25'. Said feed requiring no motion of the drill pipe other than rotation.

Upon completion of the cut as indicated by the raising of the pressure on the fluid circulating system caused by the closing of the ports 27 by the valve 15; the drill pipe and body section 1 are rotated in a reverse direction approximately one-half turn; thus causing the cutters 17 and the dogs 10 to be retracted within the body sections 1 and 2, respectively.

Having described my invention, I claim:

1. A casing cutter comprising a body, a plurality of cutters in said body and relatively rotatable with reference to said body to project the cutters, a plurality of dogs, means mounting said dogs and being relatively rotatable with reference to said body to project said dogs, said mounting means being held stationary by engagement of the dogs with the casing, and friction drive means between said dog mounting means and the cutters.

2. A casing cutter comprising a body, a plurality of horizontally positioned cutters in said body, means in which said cutters are mounted which means are rotatable with reference to the body to project the cutter, a plurality of dogs, means in which said dogs are mounted which means are rotatable with reference to the body to project the dogs, and friction drive means between said first and last named means.

3. A casing cutter comprising upper and lower body sections, means rotatably connecting said sections together, a plurality of cutters mounted in the upper body section, a plurality of dogs mounted in the lower section, dog holding means which means are rotatable with reference to the body to project the dogs, cutter holding means which means are rotatable with reference to the body to project the cutters, and friction drive means connecting said dog holding means and cutter holding means.

4. A casing cutter comprising upper and lower body sections, means swivelly connecting said sections together, a plurality of dogs, said lower body section having openings therein through which the dogs project, a driving shank on which said dogs are mounted said shank being rotatable with respect to the body to project the dogs, a plurality of cutters, said upper section having openings therein through which the cutters project, means on which the cutters are mounted which means are rotatable with reference to the body to project the cutters, and friction drive means connecting said shank and said cutter mounting means.

5. A casing cutter comprising upper and lower body sections, means swivelly connecting said sections together, a plurality of dogs, said lower body section having openings therein through which the dogs project, a driving shank on which said dogs are mounted said shank being rotatable with respect to the body to project the dogs, a plurality of cutters, said upper section having openings therein through which the cutters project, a core in which the cutters are pivotally mounted said core being rotatable with reference to the body to project the cutters, and friction drive means between said shank and said core.

6. A casing cutter comprising upper and lower body sections, means swivelly connecting said sections together, a plurality of dogs, said lower body section having openings therein through which the dogs project, a driving shank on which said dogs are mounted said shank being rotatable with respect to the body to project the dogs, a plurality of cutters, said upper section having openings therein through which the cutters project, a core in which the cutters are pivotally mounted said core being rotatable with reference to the body to project the cutters, a plurality of friction drive rings positioned between the shank and the core, certain of said rings rotating with the shank.

7. A casing cutter comprising upper and lower body sections, means swivelly connecting said sections together, a plurality of dogs, said lower body section having openings therein through which the dogs project, a driving shank on which said dogs are mounted said shank being rotatable with respect to the body to project the dogs, a plurality of cutters, said upper section having openings therein through which the cutters project, a core in which the cutters are pivotally mounted said core being rotatable with reference to the body to project the cutters, a plurality of friction drive rings positioned between the shank and the core, certain of said rings rotating with the shank, and means to vary the tension of said rings against each other.

8. A casing cutter comprising upper and lower body sections, means swivelly connecting said sections together, a plurality of dogs, said lower body section having openings therein through which the dogs project, a driving shank on which said dogs are mounted said shank being rotatable with respect to the body to project the dogs, a plurality of cutters, said upper section having openings therein through which the cutters project, a core in which the cutters are pivotally mounted said core being rotatable with reference to the body to project the cutters, a plurality of friction drive rings positioned between the shank and the core, certain of said rings rotating with the shank, and means to vary the tension of said rings against each other, said means comprising a nut screwed into the core against said rings.

9. A casing cutter comprising upper and lower body sections, mean swivelly connecting said sections together, a plurality of dogs, said lower body section having openings therein through which the dogs project, a driving shank on which said dogs are mounted said shank being rotatable with respect to the body to project the dogs, a plurality of cutters, said upper section having openings therein through which the cutters project, a core in which the cutters are pivotally mounted said core being rotatable with reference to the body to project the cutters, a plurality of friction drive rings rotating with the shank, and means to vary the tension of said rings against each other, said means comprising a nut screwed into the core against said rings, a plurality of fluid ports in the upper body section, and valve means controlling the said ports.

In testimony whereof, I affix my signature.

NEAL THOMAS McCANN.